United States Patent [19]
Kishimoto et al.

[11] Patent Number: 5,641,123
[45] Date of Patent: Jun. 24, 1997

[54] EXPANDABLE NOZZLE MECHANISM FOR A ROCKET ENGINE

[75] Inventors: Kenji Kishimoto; Yojiro Kakuma; Masaaki Yasui, all of Komaki, Japan

[73] Assignee: Mitsubishi Jukogyo Kabushiki Kaisha, Tokyo, Japan

[21] Appl. No.: 360,421

[22] Filed: Dec. 21, 1994

[30] Foreign Application Priority Data

Dec. 24, 1993 [JP] Japan .................................. 5-327380
May 17, 1994 [JP] Japan .................................. 6-102600

[51] Int. Cl.$^6$ ...................................................... B64D 33/04
[52] U.S. Cl. ...................................................... 239/265.15
[58] Field of Search ............... 244/172, 74; 239/265.11, 239/265.19, 265.33, 265.15; 89/1.815, 1.811, 1.8, 1.801, 1.802, 1.803, 1.804, 1.805; 102/374; 60/250, 229, 245, 271

[56] References Cited

U.S. PATENT DOCUMENTS

| | | | |
|---|---|---|---|
| 3,049,832 | 8/1962 | Joffe | 89/1.8 |
| 3,218,974 | 11/1965 | Samms | 60/250 |
| 3,561,679 | 2/1971 | Lager . | |
| 3,565,208 | 2/1971 | Millman | 239/265.19 |
| 4,162,040 | 7/1979 | Carey | 60/271 |
| 4,383,407 | 5/1983 | Inman | 60/271 |

FOREIGN PATENT DOCUMENTS

| | | |
|---|---|---|
| 0 173 009 | 3/1986 | European Pat. Off. . |
| 2 029 511 | 3/1980 | United Kingdom . |

OTHER PUBLICATIONS

Patent Abstract of Japan, vol. 9, No. 183 (M-400) (1906).

*Primary Examiner*—Andres Kashnikow
*Assistant Examiner*—Tien Dinh
*Attorney, Agent, or Firm*—Wenderoth, Lind & Ponack

[57] ABSTRACT

A nozzle extension mechanism for a rocket engine is applied to an engine in an upper stage rocket in a multi-stage rocket. Since a high expansion nozzle to be used in the upper stage rocket engine is long, the rocket is divided at a nozzle portion in view of volume efficiency. The nozzle portion is retracted and received around the upper stage rocket engine and is shifted to a high altitude space. The nozzle portion is assembled for use prior to operation. For this reason, in order to bring the nozzle portion from the retracted condition to the operative condition, it has been necessary to use a drive source, a power device or a shifting device for shifting the nozzle portion. This leads to a weight problem. The devices left in the upper rocket adversely affect the payload. This is resolved by using a fastening portion provided at a rear end of the high expansion nozzle that is received by and then separated from a coupling mechanism provided at a front end portion of the lower stage rocket. Both components are shifted to a high altitude space. The high expansion nozzle is retracted to a rocket engine joint portion following rearward movement of the lower stage rocket upon separation of the lower stage rocket.

12 Claims, 7 Drawing Sheets

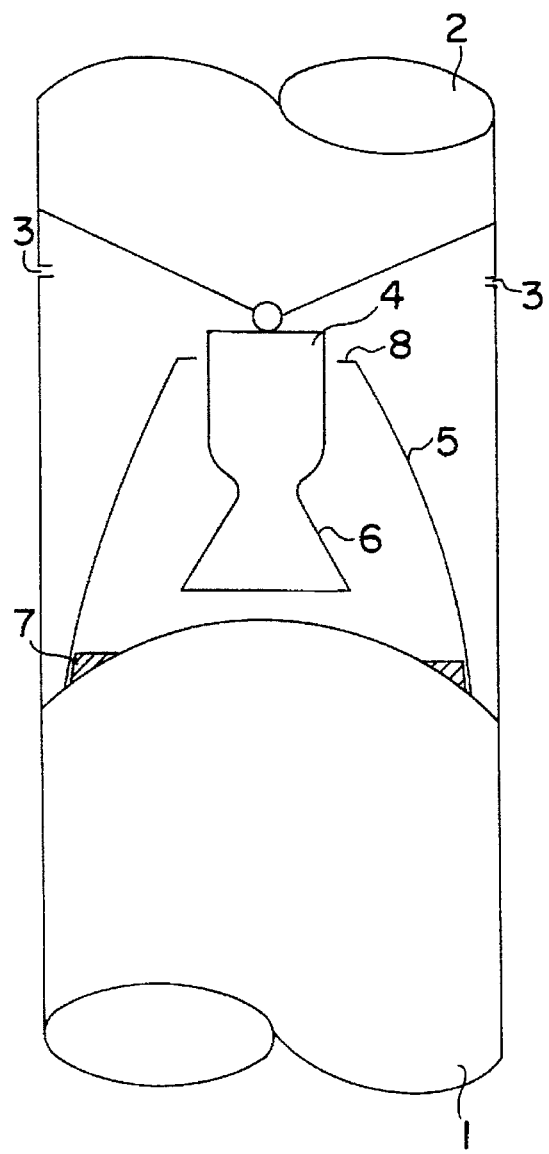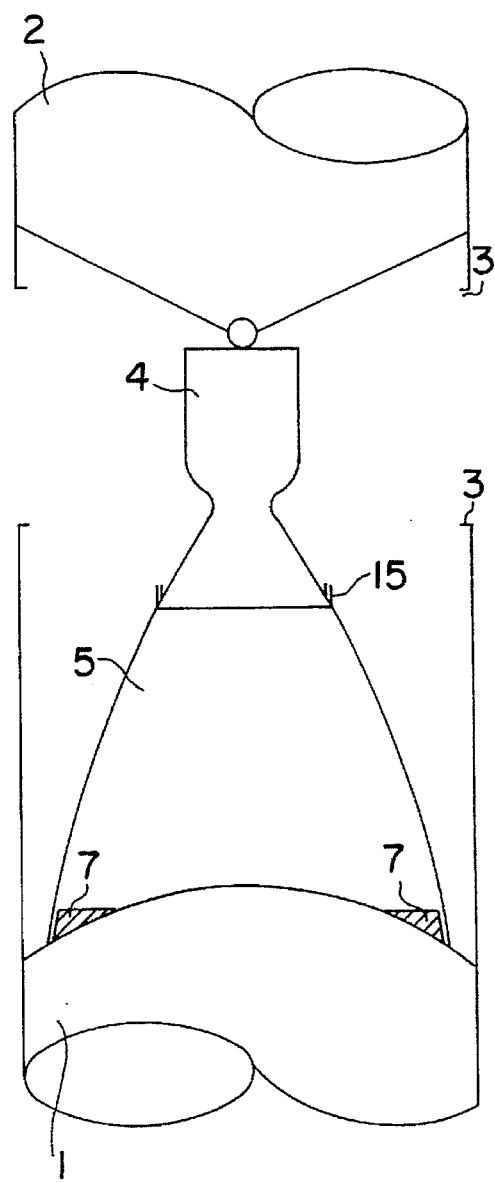
F I G. I (A)   F I G. I (B)

1

EXPANDABLE NOZZLE MECHANISM FOR A ROCKET ENGINE

BACKGROUND OF THE INVENTION

Technical Field

The present invention relates to an expansion nozzle mechanism, with a high aperture ratio, which is small in size and light in weight, and which is retracted when the high expansion nozzle is not used and is extended to a regular position when used, for a rocket engine with a high operational efficiency at high altitudes at which the ambient pressure is low, or aerospace.

BACKGROUND TECHNOLOGY

In order to effectively operate a rocket which has been launched from the earth at high altitude space, which is similar to a vacuum or in aerospace, it is necessary to use an upper stage rocket engine provided with a nozzle having a high expansion ratio, as exemplified in FIG. 12B.

The upper stage rocket engine which is to be used for propelling and controlling upper stage state rockets (second and third stages) at a high altitude, or in aerospace after the first stage rocket used for raising the rocket from the earth to the high altitude space has been released, is long in length, and suffers from a spatial problem in transferring the upper stage rocket engines to the space where the engine are operated. In order to solve this problem, the upper stage rocket engine, provided with a nozzle having a high expansion ratio, is separated at the nozzle portion, and the high expansion nozzle which constitutes a rear half portion of the nozzle is forwardly pushed and telescopically retracted up to the vicinity of the rocket engine where a part of the nozzle remains. Thus, the transfer is carried out in a small volume. In operation, the high expansion nozzle is extended rearwardly, and the nozzle is integrally formed with the nozzle portion remaining in the rocket engine for a high expansion upper stage rocket engine.

The extension/contraction of the high expansion nozzle has been conventionally carried out in the operational condition shown in the solid lines shown in FIG. 11. The high expansion nozzle 01 is shifted to the rear portion of the rocket engine 04 which is the operational position, by a shifting device 03 such as a screw jack or a piston actuator to be driven hydraulically, pneumatically or electrically by a drive device 02, which is heavy in weight.

The conventional system needs a power source (not shown) such as a hydraulic pressure source, a gas source and an electric power source, the drive device 02 such as a hydraulic motor, a gas turbine, an electric motor and the like, and the shifting device 03 such as an actuator, a screw jack, a piston or the like.

For this reason, not only the performance for launching the rocket is highly degraded, but also the rocket would be drafted in a serpentine manner with dead weights of the components mounted on the upper stage rocket as far as these components are abolished, even after the operational mode for propelling and controlling the upper stage rocket is obtained by extending the high expansion nozzle to the regular nozzle position. As a result, the mountable volume in the upper stage rocket is decreased, the weights are increased, and the load imposed on the upper stage rocket engine is increased, disadvantageously.

OBJECTS OF THE INVENTION

In order to overcome the above-described defects inherent in the conventional upper stage rocket engine, an object of the present invention is to provide an extendable nozzle mechanism for a rocket engine which does not need a power device for extension and which may be operated by separating objects, to be separated and discarded in the propelling operation of the rocket, i.e., a lower stage rocket from an upper stage rocket engine transferred under the received condition.

SUMMARY OF THE INVENTION

As described above, the high expansion nozzle is used in a highly vacuum ambient condition. In case of a launching rocket, it is used in the second stage rocket onward. In this case, during the operation of the first stage rocket, it is received in a body, and is extended during the separation of the first stage rocket. The separation of the first stage rocket is effected by imparting a momentum which is reversed to the travelling direction of the rocket, and the first stage rocket appears to be discharged relatively rearwardly as viewed from the second stage rocket.

The extendable nozzle mechanism for a rocket engine according to the present invention has the following arrangement for attaining the foregoing and other objects.

A coupling mechanism is provided at a front end portion of a lower stage rocket to be separated and discarded before operation of the upper stage rocket engine that uses the high expansion nozzle. A fastening portion for coupling the rear end of the high expansion nozzle with the coupling mechanism of the lower stage rocket at a constant holding force from the retracted condition to the operative condition is provided at a rear end of the high expansion nozzle, which is the rear half portion of the upper stage rocket engine divided back and forth at the nozzle portion. A small diameter portion is provided at a front end portion of the high expansion nozzle portion for generating a brake force by the coupling between the coupling mechanism and the fastening portion by contacting the outer periphery of the rocket engine, which is a front half portion of the upper stage rocket engine, when the high expansion nozzle is shifted rearwardly while following the rearward movement of the separated lower stage rocket, and for generating the braking force greater than the coupling force between the coupling mechanism and the fastening portion, when the rearward movement of the high expansion nozzle reaches a predetermined value. A coupling wall connected to the small diameter portion of the high expansion nozzle when the coupling between the high expansion nozzle that moved rearwardly along the outer peripheral wall and the lower stage rocket is released and a latch mechanism coupled to the coupling wall for limiting the forward movement of the high expansion nozzle are provided.

With such an arrangement, the high expansion nozzle coupled at its front end portion to the rear end portion of the rocket engine to form the upper stage rocket engine having a high expansion ratio is separated and is shifted rearwardly together with the lower stage rocket that moves rearwardly by the separation from the upper stage rocket from the received condition around the rocket engine. On the rear side of the rocket engine from which the high expansion nozzle is separated, the nozzle portion which is expanded rearwardly is left, and the small diameter portion provided at the front end portion of the high expansion nozzle is moved rearwardly in sliding contact with the outer periphery of the nozzle portion. However, as the diameter of the nozzle portion is increased, the frictional force of the sliding portion is increased. Finally, the frictional force exceeds the coupling force between the coupling mechanism of the lower stage rocket and the fastening portion of the high expansion nozzle so that the coupling between the lower stage rocket and the high expansion nozzle is released. A coupling wall to be engaged with the small diameter portion of the high expansion nozzle that has travelled rearwardly is provided on the outer periphery of the nozzle portion at which the coupling is released. Simultaneously with the release of coupling between the lower stage rocket and the high expansion nozzle, the rocket engine and the high expansion nozzle are coupled to each other to form the upper stage rocket engine having a high expansion ratio.

Furthermore, after the coupling between the rocket engine and the high expansion nozzle, the forward movement of the high expansion nozzle caused by the coupling shock is limited by the latch mechanism provided on the outer circumferential wall of the nozzle portion, and re-separation is prevented.

Thus, it is possible to dispense with the power source, drive source or actuator, which has a large weight, and was needed for extension of the nozzle in the conventional rocket system. Also, without any specific coupling release mechanism, the coupling mechanism is abolished together with the lower stage rocket. It is unnecessary to increase the load imposed on the upper stage rocket engine to overcome the problems inherent in the conventional system. Also, the coupling mechanism and the fastening portion for coupling the high expansion nozzle and the lower stage nozzle are also used as a fastening and supporting mechanism for the high expansion nozzle during the operation of the lower stage rocket engine. Thus, an unnecessary support mechanism may be dispensed with.

Also, the coupling mechanism according to the present invention may includes a support which is made of elastic material for increasing the sliding frictional force at least at the outer circumferential edge, fixed and arranged in an annular shape at the front end portion of the lower stage rocket. The fastening portion may be the inner circumferential wall at the rear end of the high expansion nozzle engaged with the outer circumferential edge of the support.

Thus, the coupling between the suitable lower stage rocket and the high expansion nozzle may be generated by the frictional force between the inner circumferential wall at the rear end of the high expansion nozzle and the outer circumferential edge of the support to thereby dispense with the support mechanism for the high expansion nozzle in the received condition. Also, it is possible to effect the coupling only by the inner circumferential wall with the support to thereby reduce the weight and to thereby facilitate the manufacture.

Furthermore, by using the elastic material for the support, it is possible to obtain a desired frictional force and also to prevent the vibration that is generated during the operation of the lower stage rocket engine from reaching the high expansion nozzle.

The coupling mechanism may be a support in which a grooved member made of elastic material is arranged in an annular shape in the outer circumferential edge in the front end portion of the lower stage rocket. The fastening portion is inserted into the grooved support. The fastening portion may be the inner and outer circumferential walls of the rear end circumferential edge of the high expansion nozzle which receives a compression force from both sides of the groove. Thus, it is possible to obtain the same effect and advantage as those in the case where the coupling mechanism is the support made of elastic material. In addition, the coupling force between the grooved support and the rear end inner circumferential wall of the high expansion nozzle is increased. It is possible to positively effect the holding action of the high expansion nozzle in the retracted condition.

Also, the coupling mechanism may be a clamping mechanism including two rods pivoted at first ends to the front end portion of the lower stage rocket, rollers provided at second ends of the rods and a spring member interposed between central portions of the rods said fastening portion being inner and outer circumferential walls of the rear end circumferential edge of the high expansion nozzle inserted in between the rollers of said clamping mechanism.

With such an arrangement, it is possible to control the coupling force between the high expansion nozzle and the lower stage rocket only by selection of the spring member as desired. Also, it is unnecessary to provide the fastening portion of the high expansion nozzle over the entire circumference of the rear end circumferential edge. It is possible to reduce the weight of the high expansion nozzle in addition to the reduction of the weight of the coupling mechanism and the releasing mechanism.

Also, in the coupling mechanism, it is possible to use a coupling bracket which is fixed at one end to the front end portion of the lower stage rocket and which is provided with cut slits for avoiding any adverse affects on the other portions by cutting the coupling bracket at the cut slits when a load which exceeds a limit is applied to the central portion of the coupling bracket.

By this arrangement, it is possible to simplify the coupling between the high expansion nozzle and the lower stage rocket. It is possible to produce the coupling mechanism at a low cost and to positively separate it by a predetermined load by controlling the cut slits. Also, it is possible to reduce the weight of the high expansion nozzle.

Also, in the extendable nozzle mechanism for a rocket engine according to the invention, the high expansion nozzle is coupled through wires to an object, to be separated and discarded during the propelling operation of the rocket, such as a lower stage rocket. The high expansion nozzle is extended to a regular position by utilizing a momentum which is caused by the rearward movement of the object to be separated and discarded.

The tension direction of the wires may be suitably controlled by providing pulleys or guides for guiding the wires which are drawn in accordance with the rearward movement of the object to be separated and discarded. Displacement may be prevented. By a cutting mechanism for cutting the first stage rocket rearwardly, the wires are cut at the time when the nozzle has been shifted to the regular position.

It is possible to use a wire cutter or the like for cutting the coupling portion of the wires and the high expansion nozzle by using gun powder.

Thus, the high expansion nozzle is extended by utilizing the force caused by the rearward movement of the wires as the object to be separated and discarded during the propelling operation of the rocket such as a lower stage rocket, is moved rearwardly. Accordingly, it is unnecessary to use an independent power source for extension of the high expansion nozzle. In addition, the wires have a very small weight for drawing the high expansion nozzle as a drive actuator.

After the high expansion nozzle is extended, the wires are cut. The wires are discarded rearwardly together with the object to be separated and discarded such as the first stage rocket. It is unnecessary to use the drive mechanism except for the part of pulley on the rocket bodyside after the extension of the high expansion nozzle. Accordingly, the extendable nozzle mechanism for a rocket engine according to the present invention may be effectively applied to the reduction or miniaturization of the rocket.

Also, in the extendable nozzle mechanism for a rocket engine according to the invention, guide rails in parallel with the engine are provided on at least one of a rear end portion of an upper stage rocket on which the rocket engine is mounted and an end portion of an object, such as a lower stage rocket, to be separated or abolished, and travelling rollers which travel along the guide rails are provided on the other. Thus, the high expansion nozzle received in the retracted condition may be moved exactly rearwardly in alignment with the axial direction of the upper stage rocket and the rocket engine. The local abutment of the high expansion nozzle against the nozzle portion outer periphery may be prevented. The high expansion nozzle may be guided exactly and coupled at the coupling position of the nozzle portion. It is also possible to prevent contact accidents from occurring with the lower stage rocket that has been released.

BRIEF DESCRIPTION OF THE DRAWINGS

In the accompanying drawings:

FIG. 1A is a cross-sectional view showing a separation part between an upper stage rocket and a lower stage rocket according to a first embodiment of the invention before separation;

FIG. 1B is a cross-sectional view at a certain time after the separation;

DESCRIPTION OF THE PREFERRED EMBODIMENTS

Figure 2:
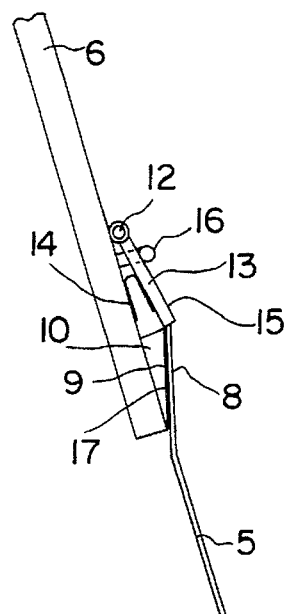
FIG. 2 is a partial cross-sectional view showing a coupling condition between a nozzle portion rear end and a high expansion nozzle small diameter portion according to the embodiment shown in FIGS. 1A and 1B.

The present invention will now be described with reference to the accompanying drawings.

As shown in FIG. 1A, a lower stage rocket i and an upper stage rocket 2 are coupled with each other by a coupler 3 having the same outside diameter as that of the upper and lower stage rockets 2 and 1. The upper and lower stage rockets are launched up to a high altitude space by the lower stage rocket engine (not shown) provided at an end of the lower stage rocket 1. In order to effectively operate the upper stage rocket engine, which is to be used in a high altitude space whose ambient pressure is similar to a vacuum, it is necessary to use an upper stage rocket engine having a high expansion ratio. The latter is very long in length at about 5 m.

For this reason, the upper stage rocket engine is separated at a nozzle portion 6 of a rocket engine 4 into the rocket engine 4 and a high expansion nozzle 5. The high expansion nozzle 5 is raised around an outer periphery of the rocket engine 4 and is contracted to a length of about three fifths. The nozzle 5 is accommodated in a gap portion defined between a rear end of the upper stage rocket 2 and a tip end of the lower stage rocket 1 and transferred to the high altitude space. It is thus possible to reduce the length of the gap, and reduce the weight by about 100 kg. An inner circumferential wall of a rear end portion of the high expansion nozzle 5 is a fastening portion and has inserted therein and is coupled with a support 7. The support 7 is an annular coupling means formed of an elastic material such as rubber, is fixed to the tip end of the lower stage rocket 1 and has a high friction coefficient for absorption. The support 7 has substantially the same configuration as that of an outlet portion (i.e., rear end portion) for the fastening portion for the high expansion nozzle 5 and has an outer configuration of a truncated cone shape which is approximately larger than the inner circumferential shape of the rear end of the high expansion nozzle 5. The rear end portion of the high expansion nozzle 5 is pressingly inserted into the support 7 upon assembling the rocket.

When the combustion of the lower stage rocket engine mounted at the rear end of the lower stage rocket 1 is terminated, the lower stage rocket 1 is released from the upper stage rocket 2 and discarded because it interferes with the mission. This is carried out by imparting a motion that is reverse to the advance direction to the lower stage rocket 1 and thus by the rearward movement of the lower stage rocket 1. The high extendable nozzle 5, which is under the pressing insertion condition while being engaged with the support 7, is also moved rearwardly together with the lower stage rocket 1, as shown in FIG. 1B. The rearward movement of the high expansion nozzle 5 is carried out by an operation in which the nozzle 5 is moved rearwardly along the outer circumferential portion of the rocket engine 4 and in an axial direction of the upper stage rocket 2 and the lower stage rocket 1. When a small diameter portion provided at the front end portion of the nozzle 5 reaches a latch mechanism 15, to be described later, provided on the outer circumferential portion of the nozzle portion 6 of the rocket engine 4, the rearward force is braked by a frictional force between the latch mechanism 15 and the small diameter portion 8, but the inertia of the lower stage rocket is large enough to continue the rearward movement. At a position where the front end portion has just passed through the latch mechanism 15, the small diameter portion 8 is brought into sliding contact with the engagement surface 9, which has a larger diameter than that of the latch portion 15. A larger frictional force than the coupling force between the support 7 and the inner circumferential surface of the rear edge 7 coupled with the support portion for coupling the high expansion nozzle 5 and the lower stage rocket 1 is generated, so that the coupling is released to thereby separate the high expansion nozzle 5 from the lower stage rocket 1.

As described above, the coupling between the fastening portion which is the rear end inner circumferential wall of the high expansion nozzle and the support used as a coupling device provided at the tip end of the lower stage rocket is defined by a gradient for releasing, and in addition is effected only by the coupling force of the friction force. Accordingly, the coupling may readily be attained. When the coupling is released, the high expansion nozzle 5 is fixed under the condition that the small diameter portion 8 thereof is brought into sliding contact with the coupling surface 9 formed on the outer circumferential wall of the nozzle portion 6. The lower stage rocket 1 solely is moved and separated so as to be discarded. Thus, the operational condition is attained by utilizing the movement of the lower stage rocket 1 being discarded with the high expansion nozzle 5 kept under an accommodation condition, without the need to use a power source, a drive source or any other special shifting device. As a result, it is possible to attain a weight reduction of about 20 to 30 kg.

Subsequently, the coupling portion between the latch mechanism 15, the nozzle portion 6 and the high expansion nozzle 5 will be explained.

A ring 10 is fixed over the entire circumference at the rear outer circumferential portion of the nozzle portion 6. The coupling surface 9 is formed on the outer circumferential wall of the ring 10. Furthermore, the latch mechanism 15 is provided at an equal interval over the entire circumference of the nozzle portion 6 in front of the ring 10. Each latch mechanism 15 is composed of a hinge 12 provided on the outer circumferential wall of the nozzle portion 6, a lever 13 pivoted to the hinge 12, a spring 14 interposed between the lower stage surface and the outer circumferential wall of the nozzle portion 6 for imparting an outward force to the lever 13, and a stopper 16 for preventing a jump-up action of the lever 13.

As described above, the high expansion nozzle 5 coupled to the lower stage rocket 1 is moved rearwardly, and moved while pushing the lever 13 by the inner circumferential wall of the small diameter portion 8 formed at the front end portion of the high expansion nozzle 5. When the front edge of the small diameter portion 8 has passed through the rear end of the lever to complete the movement, the lever 13 is released. As a result, the lever 13 is expanded outwardly by the force of the spring 14 to prevent movement in a reverse direction (i.e., the forward direction) of the high expansion nozzle.

On the other hand, the inner circumferential wall of the small diameter portion 8 which has passed through the lever 13 is moved toward the coupling surface 9 of the ring 10 having a larger diameter than a diameter defined by the lever 13 under the condition that the lever 13 is pushed downwardly by the spring 14, whereby the frictional force of the sliding portion therebetween is increased abruptly, and the coupling between the rear edge of the high expansion nozzle and the front edge portion of the lower stage rocket is released. The small diameter portion 8 remains under the condition it is brought into, i.e. sliding contact with the coupling surface 9, without any modification. The small diameter portion 8 is thus coupled with the coupling surface 9. Incidentally, a seal material 17 is applied in advance to the coupling surface. The leakage of gas between the coupling surface 9 and the small diameter portion 8 is sealed by the seal material 17.

A guide device for exactly guiding the high expansion nozzle 5, which is moved rearwardly together with the lower stage rocket 1 during the separation of the lower stage rocket 1, in the axial direction of the rocket engine 4 will now be described with reference to FIG. 3.

Figure 3A:
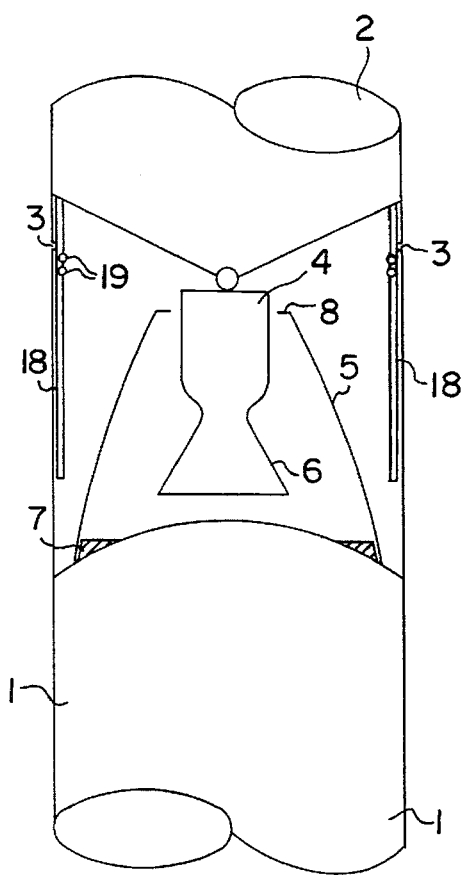
FIG. 3A is a side elevational sectional view showing a guide device for guiding the lower stage rocket and the high expansion nozzle rearwardly before the separation of the lower stage rocket in the separation part between the upper stage rocket and the lower stage rocket according to a second embodiment of the invention.
Figure 3B:
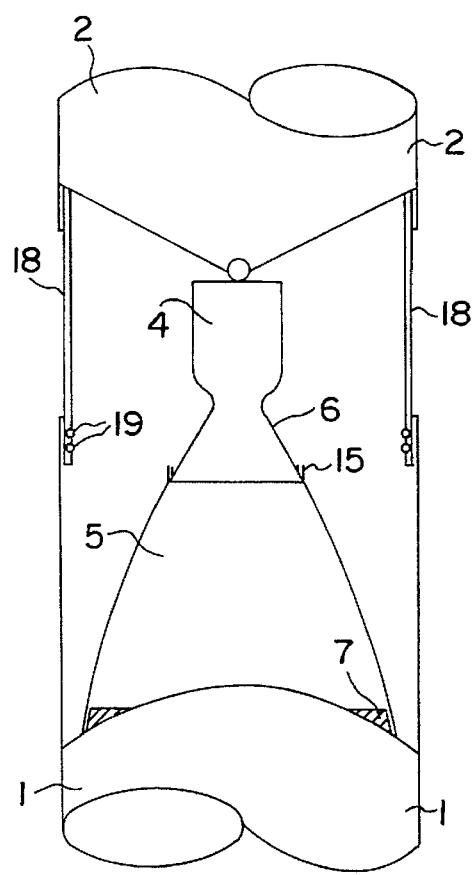
FIG. 3B is a side elevational sectional view showing the state where the high expansion nozzle is coupled with the nozzle portion.

Three or more guide rails 18 are provided at equal intervals, rearwardly in parallel with the body axis of the upper stage rocket 2 on an inner circumferential wall of an outer plate at the rear end of the upper stage rocket. On the other hand, a plurality of travelling rollers 19 which travel on the guide rails 18 are provided on the inner circumferential wall of the outer plate at the front edge of the lower stage rocket 1 at positions corresponding to the guide rails 18. Accordingly, in the case where the accommodation condition of the high expansion nozzle 5 shown in FIG. 3A is changed to the operational condition shown in FIG. 3B, the high expansion nozzle 5 is moved rearwardly along the axis of the upper stage rocket 2 (i.e., an axis of the rocket engine 3). Thus, it is possible to align the coupling surface 9 and the small diameter portion 8 formed in the nozzle portion 6 without any twist phenomenon.

It is of course possible to provide the travelling rollers at the rear end portion of the upper stage rocket 2 and to provide the guide rails at the front edge portion of the lower stage rocket 1.

In the foregoing embodiment, the guide device is provided as shown in FIG. 1, but it is possible to ensure the same effect in any of the other embodiments to be described later.

Figure 4A:
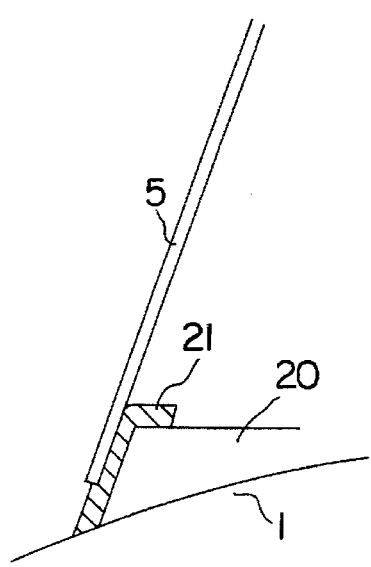
FIG. 4A is a partial sectional view showing the coupling mechanism and the fastening portion shown in FIGS. 1A and 1B before the separation according to a third embodiment of the invention.
Figure 4B:
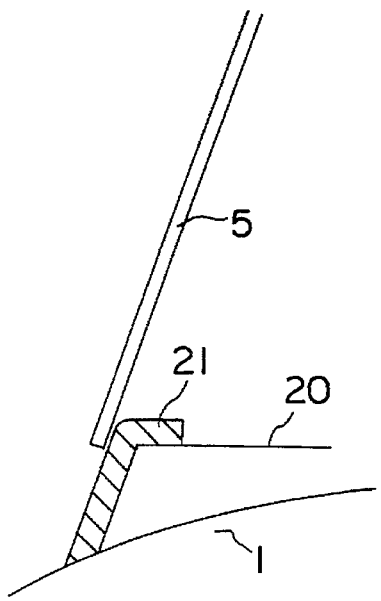
FIG. 4B is a partial sectional view showing the coupling mechanism and the fastening portion shown in FIGS. 1A and 1B after the separation.

FIGS. 4A and 4B are cross-sectional views showing another embodiment in which a support is used as a coupling device at the front edge of the lower stage rocket 1.

The support is composed of a body portion 20 fixed to the lower stage rocket 1 and a coupling portion 21 which is made of elastic material and which coats the circumferential edge portion of the body portion 20. The configuration and effect of the support are the same as those of the above-described support 7. However, the support (composed of a body portion 20 and a coupling portion 21) has an advantage in that it may be light in weight in comparison with the former support 7.

Figure 5A:
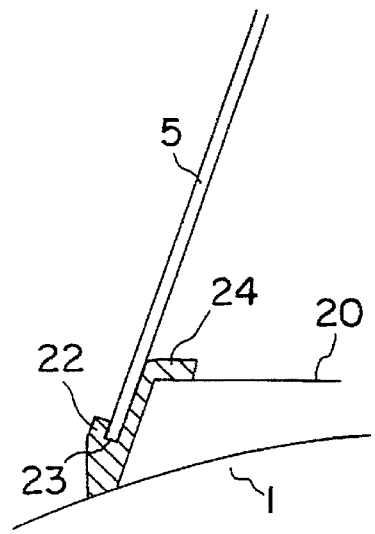
FIG. 5A is a partial sectional view showing the coupling mechanism and the fastening portion shown in FIGS. 1A and 1B before the separation according to a fourth embodiment of the invention.
Figure 5B:
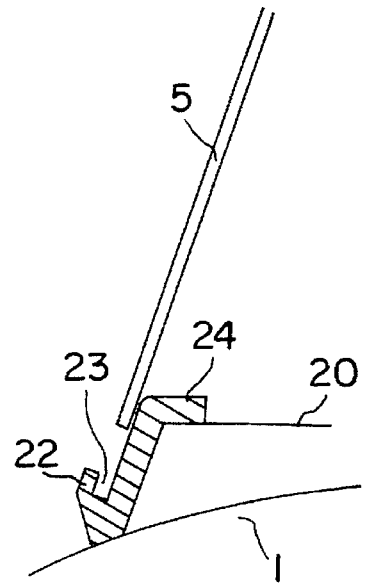
FIG. 5B is a partial sectional view showing the coupling mechanism and the fastening portion shown in FIGS. 1A and 1B after the separation.

FIGS. 5A and 5B show a grooved support 24 in which, in order to more positively ensure the coupling between the high expansion nozzle 5 and the lower stage rocket 1 than in the foregoing embodiment, an outer circumferential support damper 22 is provided over the entire circumference or a part thereof on the outer wall side of the high expansion nozzle 5, in addition to the above-described truncated conical support 21, which is engaged with the fastening portion at the inner wall of the high expansion nozzle 5, thereby forming a groove 23. The fastening portion defined by the rear end inner circumferential wall of the high expansion nozzle 5 is inserted into the groove so as to be clamped.

Incidentally, in this embodiment, it is preferable to facilitate the release of the coupling by forming the outer circumferential support damper 22 on the outer wall side of the grooved support 24 substantially as a cylindrical wall, or making it in a collapsible fashion, or imparting a flexibility to it, without completely pressing it with the conical wall.

Figure 6A:
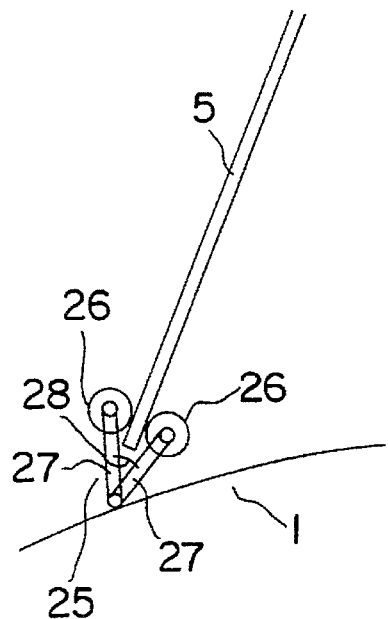
FIG. 6A is a partial sectional view showing the coupling mechanism and the fastening portion shown in FIGS. 1A and 1B before the separation according to a fifth embodiment of the invention.
Figure 6B:
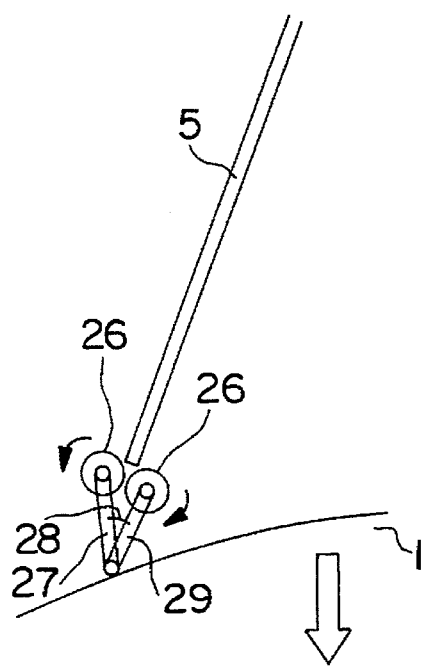
FIG. 6B is a partial sectional view showing the coupling mechanism and the fastening portion shown in FIGS. 1A and 1B after the separation.

FIGS. 6A and 6B show an easy coupling/releasing mechanism between the high expansion nozzle 5 and the lower stage rocket 1 using a clamping mechanism 25 provided with rollers 26 instead of the supports 7, 21 or the grooved support 24 used in the foregoing embodiments.

The clamping mechanism 25 is composed of two rods 27 each having a proximal end pivoted coaxially with a horizontal shaft at the tip end portion of the lower stage rocket 1. Rollers 26 are provided at respective distal ends of the rods 27, and a spring member 28 is interposed between the central portions of the rods 27 for imparting a fastening force to the rods 27.

In the clamping mechanism 25, the fastening portion provided at the rear end of the high expansion nozzle 5 and inserted between the rollers 26 is always pressed and fastened from the inside and the outside by the spring force. Upon the separation of the lower stage rocket 1, the lower stage rocket 1 is shifted rearwardly, and at this time, the high expansion nozzle 5 is shifted rearwardly to the regular position together with the lower stage rocket 1 while being clamped by the clamping mechanism 25. When the high expansion nozzle 5 is held at the regular position, only the lower stage rocket 1 is shifted rearwardly. At this time, the clamping mechanism 25 is separated rearwardly along with the conical wall of the high expansion nozzle 5 while clamping the fastening portion of the high expansion nozzle 5 from the inside and outside by the movable mechanism of the rods 27. With this clamping mechanism 25, it is possible to easily release and couple the high expansion nozzle 5 and the lower stage rocket 1, and also possible to easily effect the coupling of the high expansion nozzle 5 with nozzle portion 6.

Furthermore, in this embodiment, it is possible to set the desired coupling force by suitably selecting the spring member 28. The supporting (holding) of the high expansion nozzle 5 may be carried out in the retracted state without fail. In addition, upon the release from the lower stage rocket 1, the release action may be carried out in an exact state. Also, it is unnecessary to provide the fastening portion over the entire circumference of the rear end of the high expansion nozzle. It is sufficient to enhance the mechanical strength only at the fastening portion which is to be inserted between the rollers 26. Thus, it is possible to reduce a weight of the high expansion nozzle 5.

Figure 7A:
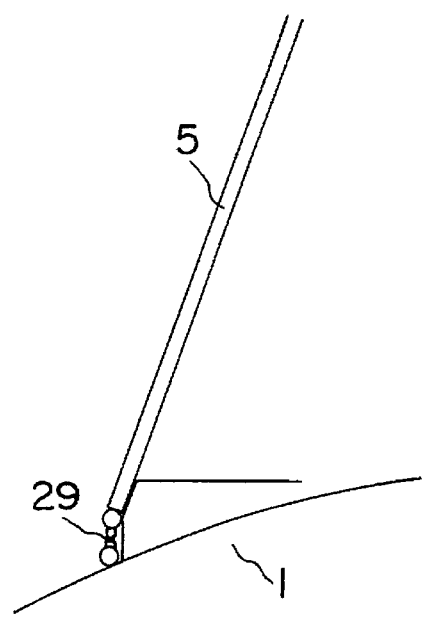
FIG. 7A is a partial sectional view showing the coupling mechanism and the fastening portion shown in FIGS. 1A and 1B before the separation according to a sixth embodiment of the invention.
Figure 7B:
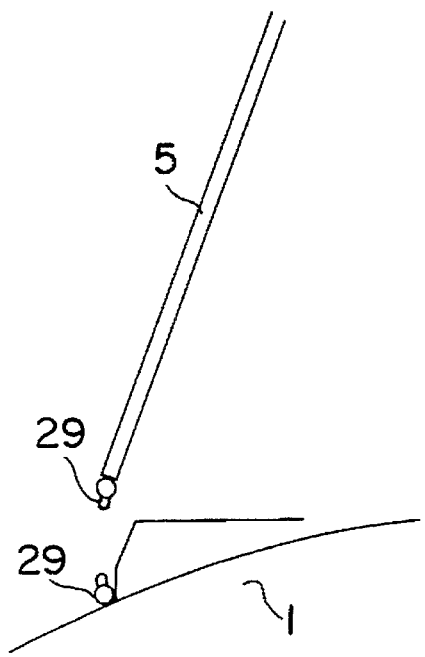
FIG. 7B is a partial sectional view showing the coupling mechanism and the fastening portion shown in FIGS. 1A and 1B after the separation.

In FIGS. 7A and 7B, the lower stage rocket 1 and the high expansion nozzle 5 are coupled with each other by a coupling bracket 29, and the high expansion nozzle 5 is coupled with the nozzle portion 6 of the rocket engine 4 by the rearward shift of the lower stage rocket 1 after the high expansion nozzle 5 has been shifted rearwardly to a regular extendable position. In the coupling bracket 29, there is provided a mechanically weak portion, i.e. a cut groove, at which the bracket is divided. As a result, it is possible to positively carry out the separation with a predetermined load and also to carry out the coupling between the lower stage rocket 1 and the high expansion nozzle 5 with a simple mechanism. It is also possible to reduce the weight of the high expansion nozzle. Incidentally, the coupling bracket 29 may be formed by a wire-like member.

Figure 8A:
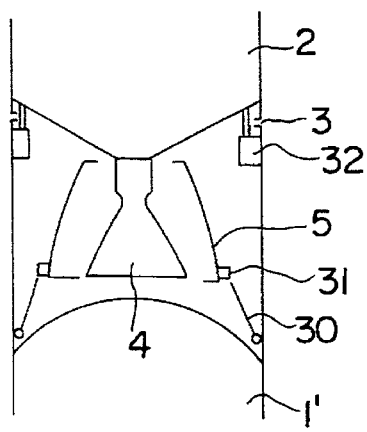
FIGS. 8A and 8B are views showing the state of the separation part between the upper stage rocket and the lower stage rocket according to a seventh embodiment, FIG. 8A being a cross-sectional view showing the high expansion nozzle before extension, and FIG. 8B being a cross-sectional view showing the high expansion nozzle after extension.
Figure 8B:
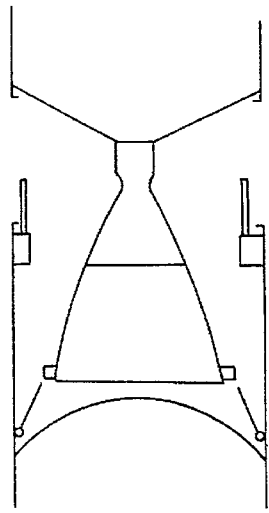

FIGS. 8A and 8B show an embodiment in which the lower stage rocket 1' and the high expansion nozzle 5 are directly coupled with each other by wires 30. As shown in FIG. 8A, the high expansion nozzle 5 is received in a retracted state around the rocket engine 4, and the rear end of the high expansion nozzle 5 is coupled with the lower stage rocket 1' by the wires 30. Reference numeral 31 designates a wire cutter using, for example, gun powder. The cutters are mounted on the outer wall of the rear end portion of the high expansion nozzle 5. Reference numeral 32 denotes a separation mechanism.

In the rocket shown in FIGS. 8A and 8B, when the first stage rocket 1' has been completely burnt after the launching operation of the rocket, the first and second stage rockets are separated so that the first stage rocket is shifted rearwardly. The expansion nozzle 5 coupled to the first stage rocket 1' by the wires 30 is drawn by the first stage rocket 1' from the retracted position. When the expansion nozzle 5 is shifted to the coupling position with the engine body 4, the wire cutters 31 are operated to cut the wires 30 to complete the shift of the high expansion nozzle 5. The condition upon the separation is shown in FIG. 8B.

Figure 9A:
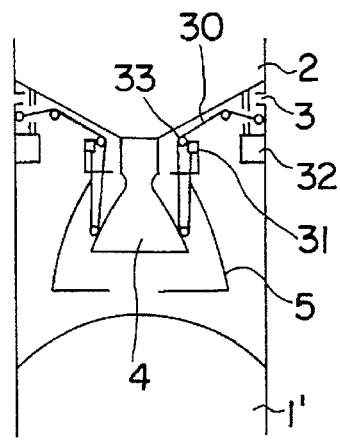
FIGS. 9A and 9B are views showing the state of separation between the upper stage rocket and the lower stage rocket according to an eighth embodiment, FIG. 9A being a cross-sectional view showing the high expansion nozzle before extension, and FIG. 9B being a cross-sectional view showing the high expansion nozzle after extension.
Figure 9B:
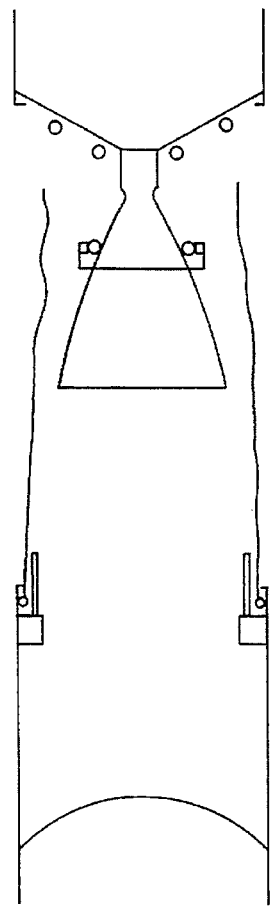

FIGS. 9A and 9B show another embodiment. As shown in FIG. 9A, wires 30 connected to the high expansion nozzle 5 through wire cutting mechanisms 31 are guided by a plurality of pulleys 33 and connected to the first stage rocket 1'.

In this embodiment, during the retraction and expansion of the high expansion nozzle 5, the wires 30 always maintain an extended condition, and the tension applied to the wires 30 during the expansion is kept uniform. As a result, a slant or tilt of the high expansion nozzle 5 is prevented during the expansion operation.

Also, there is no entanglement of the wires 30 during the expansion and retraction of the high expansion nozzle 5.

The other structure and effect are the same as those in the embodiment shown in FIGS. 8A and 8B.

Figure 10A:
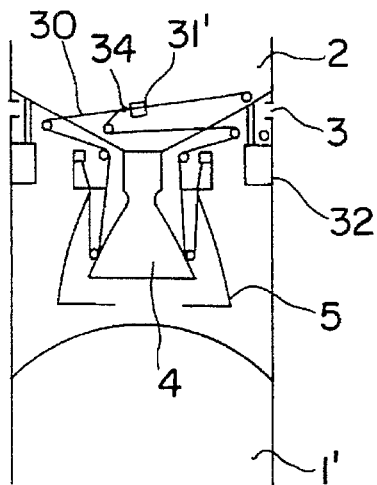
FIGS. 10A and 10B are views showing the state of separation between the upper stage rocket and the lower stage rocket according to a ninth embodiment, FIG. 10A being a cross-sectional view showing the high expansion nozzle before extension, and FIG. 10B being a cross-sectional view showing the high expansion nozzle after extension.
Figure 10B:
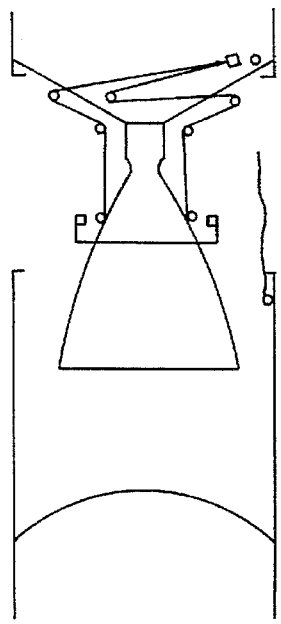
Figure 11:
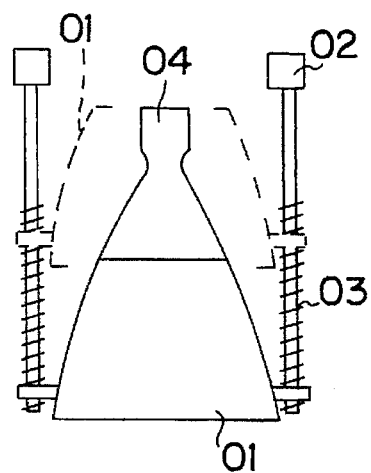
FIG. 11 is a side elevational sectional view showing an example of a conventional extendable nozzle mechanism for a rocket engine.
Figure 12A:
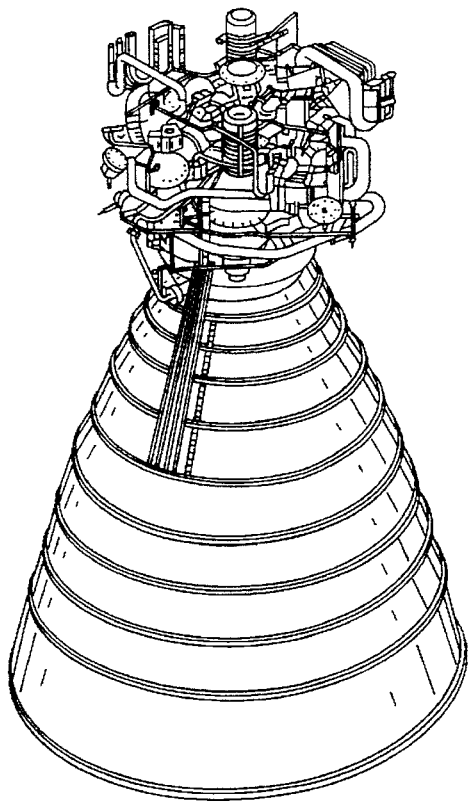
FIGS. 12A and 12B are perspective views showing upper stage rocket engines, FIG. 12A showing an upper stage rocket engine having no extendable nozzle, and FIG. 12B showing an upper stage rocket engine having an extendable nozzle.
Figure 12B:
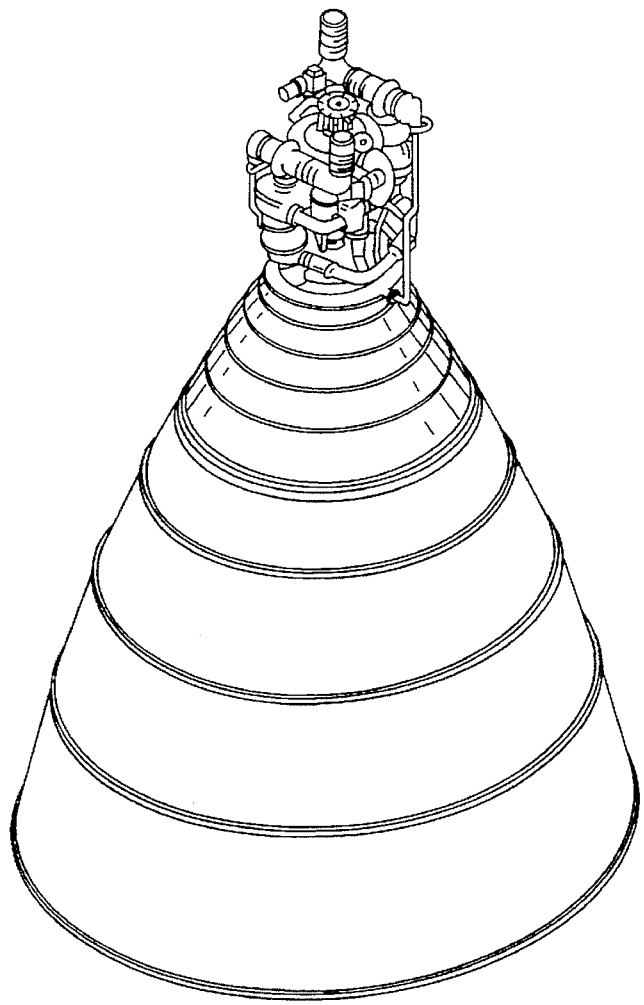

In another embodiment shown in FIGS. 10A and 10B, a plurality of wires 30 coupled to a plurality of positions of the high expansion nozzle 5 are bundled at one position 34 and thereafter are connected at one position to the first stage rocket 1' through a wire cutting mechanism 32.

In the case where the first stage rocket 1' is drawn from the plurality positions of the first stage rocket 1' by the plurality of wires 30 as shown in FIGS. 8A, 8B, and 9A, 9B, there is a fear that the tension for drawing the high expansion nozzle 5 would be non-uniform when the first stage rocket 1' is slanted. In order to avoid this defect, the coupling point 34 between the wires 30 and the first stage rocket 1' is limited to one position.

Since the wires are branched into a plurality of wires within an interior of the rear end portion of the upper stage rocket 2, the high expansion nozzle 5 may be uniformly tensioned. Also, with such an arrangement, a single cutting mechanism 32 suffices.

The other structure and effect of this embodiment are the same as those shown in FIGS. 8A, 8B and 9A, 9B.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

As described above in detail, according to the present invention, the high expansion nozzle is formed as an extendable type to thereby reduce the space for receiving the upper stage rocket engine and to reduce the weight of the body. For example, the case of an engine having a diameter of 4 m and a length of 5 m, if the length may be reduced to 3 m, it is possible to reduce the weight of the body by 100 kg.

Also, since for extending the retracted nozzle, the high expansion nozzle is extended by using the momentum of a separated and discharged object, there is no need to provide a special drive source, power source or shifting device. This makes it possible to simplify the structure and to enhance the reliability. Also, the weight may be reduced by about 20 to 30 kg in comparison with other systems. In particular, according to the invention, it is possible to reduce the weight of the upper stage rocket, which leads to an improvement of the launching performance.

Also, since a special device for supporting the high expansion nozzle in a retracted condition may be dispensed with, the launching performance of the rocket is largely improved. The coupling mechanism for coupling the high expansion nozzle and the lower stage rocket does not need a special separation device. The coupling mechanism is abolished together with the lower stage rocket. Therefore, the performance of the upper stage rocket may be improved.

What is claimed is:

1. An extendible nozzle mechanism for a rocket engine, comprising:

a rocket engine located on a rear end of an upper stage rocket, said rocket engine comprising a nozzle portion having a latch mechanism at a rear end outer circumferential wall thereof and having an interconnecting surface;

a coupling mechanism located at a front end portion of a lower stage rocket; and a high expansion nozzle comprising a rear end portion that has a fastening portion coupled with said coupling mechanism in a retracted position of said high expansion nozzle at which said high expansion nozzle is loosely engaged around an outer periphery of said rocket engine, and a front end portion having a small diameter portion that is brought into sliding contact with an outer circumferential wall of said nozzle portion of said rocket engine so as to release said coupling mechanism from being coupled with said fastening portion and so as to engage with said interconnecting surface when said high expansion nozzle is moved from said retracted position to an operative position by separation of the lower stage rocket.

2. The extendible nozzle mechanism according to claim 1, wherein said coupling mechanism is fixed to the front end portion of the lower stage rocket, and said coupling mechanism comprises an annular support formed of an elastic material at least at its circumferential edge portion, said fastening portion comprising an inner circumferential wall formed at the rear end of said high expansion nozzle and coupled to said annular support.

3. The extendible nozzle mechanism according to claim 1, wherein said coupling mechanism is fixed to the front end portion of said lower stage rocket, and said coupling mechanism comprises an annular grooved support with a recess at its circumferential edge portion, said grooved support being made of elastic material, said fastening portion including inner and outer circumferential walls of a rear end circumferential edge of said high expansion nozzle inserted into said groove.

4. The extendible nozzle mechanism according to claim 1, wherein said coupling mechanism comprises a clamping mechanism including two rods pivoted at first ends to the front end portion of said lower stage rocket, rollers provided at second ends of said rods and a spring member interposed between central portions of said rods, said fastening portion comprising inner and outer circumferential walls of a rear end circumferential edge of said high expansion nozzle that are inserted in between said rollers of said clamping mechanism.

5. The extendible nozzle mechanism according to claim 1, wherein said coupling mechanism comprises a coupling bracket fixed at one end to the front end portion of said lower stage rocket and provided with a cutting slit at a central portion, and said fastening portion comprises a rear end circumferential edge of said high expansion nozzle having the other end of said coupling bracket fixed thereto.

6. An extendible nozzle mechanism for rocket engine, comprising:

a rocket engine having a rear end portion;

a high expansion nozzle movable from a first position loosely engaged around an outer periphery of said rocket engine to a second position in which a front end portion of said high expansion nozzle portion is coupled with said rear end portion of said rocket engine;

an object to be separated from connection with said rocket engine; and wires coupled with said high expansion nozzle portion and said object to be separated for moving said high expansion nozzle portion from said first position to said second position with the momentum of said object to be separated upon separation of said object.

7. The extendible nozzle mechanism of claim 6, wherein:
said rocket engine comprises a mechanism for coupling with said front end portion of said high expansion nozzle.

8. The extendible nozzle mechanism of claim 6, and further comprising a cutter for cutting said wires.

9. The extendible nozzle mechanism of claim 6, wherein said wires are coupled to said object with a single wire and are arranged to move said high expansion nozzle without tilting said high expansion nozzle relative to the axis of said rocket engine.

10. The extendible nozzle mechanism of claim 9, wherein a cutter is provided for cutting said single wire.

11. An extendible nozzle mechanism for a rocket engine for a rocket, comprising:

a rocket engine having a rear end portion, said rocket engine being located on a rocket also having a rear end portion;

a high expansion nozzle movable from a first position loosely engaged around an outer periphery of said rocket engine to a second position in which a front end portion of said high expansion nozzle is coupled with said rear end portion of said rocket engine;

an object to be separated from connection with said rocket, said object having an end portion; and guide rails parallel to said rocket engine located on one of said rear end portion of said rocket and said end portion of said object and traveling rollers engaged with said guide rails located on the other of said rear end portion of said rocket and said end portion of said object.

12. The extendible nozzle mechanism of claim 11, wherein said object comprises a releasable coupling that is coupled with said high expansion nozzle and that is releasable upon said high expansion nozzle moving to said second position.

* * * * *